(12) United States Patent
Cho et al.

(10) Patent No.: US 9,311,543 B2
(45) Date of Patent: Apr. 12, 2016

(54) SYSTEM AND METHOD FOR RECOGNIZING SPEED LIMIT SIGN USING FRONT CAMERA

(71) Applicant: MANDO CORPORATION, Pyeongtaek-si (KR)

(72) Inventors: Young Ha Cho, Yongin-si (KR); Chae Seok Lim, Yongin-si (KR); Min Woo Park, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/267,338

(22) Filed: May 1, 2014

(65) Prior Publication Data

US 2015/0206018 A1    Jul. 23, 2015

(30) Foreign Application Priority Data

Jan. 17, 2014    (KR) .................. 10-2014-0006039

(51) Int. Cl.
*G06K 9/00* (2006.01)
*G06K 9/62* (2006.01)

(52) U.S. Cl.
CPC .......... *G06K 9/00818* (2013.01); *G06K 9/6269* (2013.01)

(58) Field of Classification Search
None
See application file for complete search history.

(56) References Cited

U.S. PATENT DOCUMENTS

2008/0137908 A1* 6/2008 Stein et al. ............... 382/103
2011/0249862 A1* 10/2011 Tokikura et al. .......... 382/103
2011/0249867 A1* 10/2011 Haas et al. ................ 382/103
2013/0163896 A1* 6/2013 Chen et al. ................ 382/278
2014/0079287 A1* 3/2014 Daniell .................... 382/103

OTHER PUBLICATIONS

Møgelmose et al, "Traffic Sign Detection and Analysis: Recent Studies and Emerging Trends," 2012, 15th International IEEE Conference on Intelligent Transportation Systems, pp. 1310-1314.*
Gilani, "Road Sign Recognition based on Invariant Features using Support Vector Machine," 2007, pp. i-vii and 1-79.*
Ach et al, "Real-time Detection of Traffic Signs on a Multi-Core Processor," 2008, IEEE Intelligent Vehicles Symposium, pp. 307-312.*
"Speed Limit Sign Recognition System Using Front Camera" Published on May 2, 2013 by Young-Ha Cho; Chae-Seok Lim; Min-Woo Park. Its machine translation provided by Google Translate.

* cited by examiner

*Primary Examiner* — David F Dunphy
(74) *Attorney, Agent, or Firm* — Ladas & Parry, LLP

(57) ABSTRACT

Disclosed herein are a speed limit sign recognition system and method using a front camera which can track a traffic sign continuously appearing in images which are obtained by a photographing speed limit sign located in front of a driver using a camera mounted on the front of the vehicle, recognize an internal numeral of the traffic sign, and inform the driver of an actual limit speed through the recognized numeral, including: an image acquisition unit for acquiring a front image using a front camera; a traffic sign detector for detecting a traffic sign from the acquired front image; a recognition unit for recognizing an internal numeral in the detected traffic sign; a tracking unit for tracking a traffic sign continuously appearing in the front image, and eliminating a temporarily misrecognized object; and a decision unit for determining a result of speed limit recognition on the recognized traffic sign.

20 Claims, 8 Drawing Sheets

SYSTEM AND METHOD FOR RECOGNIZING SPEED LIMIT SIGN USING FRONT CAMERA

CROSS-REFERENCE TO RELATED APPLICATION(S)

This application claims priority to Korean Patent Application No. 10-2014-0006039, filed on Jan. 17, 2014, the disclosure of which is incorporated herein by reference in its entirety.

BACKGROUND OF THE INVENTION

1. Field of the Invention

Exemplary embodiments of the present invention relate to a system and method for recognizing a speed limit sign using a front camera, and more particularly, to a speed limit sign recognition system and method using a front camera which can track a traffic sign continuously appearing in images which are obtained by a photographing speed limit sign located in front of a driver using a camera mounted on the front of the vehicle, recognize an internal numeral of the traffic sign, and inform the driver of an actual limit speed through the recognized numeral.

2. Description of the Related Art

Intelligent vehicles employ systems, such as a Driver Assistance System (DAS), a Lane Detection Warning (LDW), a High Beam Assist (HBA), a Forward Collision Warning (FCW), and the like, for the purpose of providing drivers with "safety" and "convenience".

In such an intelligent vehicle, a technology to which a computer vision system is applied intends to synthesize, process, and apply the information on the environment of the vehicle through a camera, and thus many application, such as a lane departure warning, a distance control assist system, a pedestrian identification system, a parking assist system, a traffic sign recognition, and the like are made.

Of the applications, the traffic sign recognition is one of important technologies which cannot be overlooked when safety is considered, but the traffic sign recognition has not made much progress as comparison with other technologies. The traffic sign recognition can have several types of traffic signs as the objects thereof, but a research on speed limit sign recognition thereof has been made relatively little against the importance thereof.

The results of the conventional researches show a very high recognition rate with respect to triangular and circular traffic signs (except for a speed limit sign) according to the shapes of traffic signs, but show a relatively low recognition rate with respective to the speed limit sign.

SUMMARY OF THE INVENTION

An object of the present invention is to provide a speed limit sign recognition system and method using a front camera which can track a traffic sign continuously appearing in images which are obtained by a photographing speed limit sign located in front of a vehicle using a camera mounted on the front of the vehicle, recognize an internal numeral of the traffic sign, and inform the driver of an actual limit speed through the recognized numeral.

In accordance with one aspect of the present invention, a method for recognizing a speed limit sign using a front camera includes: (a) acquiring a front image using a front camera; (b) detecting a traffic sign from the acquired front image; (c) recognizing an internal numeral in the detected traffic sign; (d) tracking a traffic sign continuously appearing in the front image, and eliminating a temporarily misrecognized object; and (e) determining a result of recognition on the recognized traffic sign.

In addition, in step (b), a Haar-Feature based Viola-Jones Adaptive Boosting (Adaboost) algorithm, which is used for object detection, may be used to detect the traffic sign.

In addition, the Haar-Feature based Viola-Jones Adaptive Boosting (Adaboost) algorithm may be configured to include a plurality of strong classifiers in a cascade structure, and to identify whether an input image is a traffic sign image (positive sample) obtained by adding one or two margin pixels to an extracted image and then performing normalization into 20×20, or a non-traffic sign image (negative sample) randomly extracted from an image which does not include an image.

In addition, the Haar-Feature based Viola-Jones Adaptive Boosting (Adaboost) algorithm may include: a traffic sign training (sample training) step of training a detector using a traffic sign image (positive sample), which is an object to be actually recognized, and a non-traffic sign image (negative sample); and a scan-window search step of determining whether a sub-window, which is received using a scan-window search scheme with respect to a region of interest (ROI) of the front image, corresponds to an actual "traffic sign" or a "non-traffic sign".

In addition, the Haar-Feature based Viola-Jones Adaptive Boosting (Adaboost) algorithm may be configured to train the detector using the traffic sign image (positive sample) and the non-traffic sign image (negative sample) which are in a ratio of 1:2 in number.

In addition, the Haar-Feature based Viola-Jones Adaptive Boosting (Adaboost) algorithm may be configured to train only for a part constituted by 20 horizontal and 10 vertical in an image normalized into 20×20 through a horizontal detector, or to train only for a part constituted by 10 horizontal and 20 vertical in an image normalized into 20×20 through a vertical detector.

In addition, the Haar-Feature based Viola-Jones Adaptive Boosting (Adaboost) algorithm may be to detect a region on which an overlap occurs by the horizontal detector and the vertical detector, as an actual "traffic sign" region.

In addition, in step (c), an actual limit speed may be calculated using a support vector machine (SVM) with respect to a region which is determined as a "traffic sign" region in a detection result of step (b).

In addition, step (c) may include: a sample training step of detecting feature points using a traffic sign image (positive sample) and a non-traffic sign image (negative sample), training a recognizer with the feature points, and calculating a support vector; and a speed recognition step of calculating probabilities of belonging to traffic sign image categories with inner products between the calculated support vector and feature points of an input image, and recognizing a numeral of the greatest probability value as a speed.

In addition, in step (d), the traffic sign may be tracked according to template matching, the inside of a traffic sign recognized in an image of time "t" may be set as a template, a region of interest (ROI) in an image of time "t+1" may be limited on the basis of a moving speed of a corresponding vehicle, a tracker may be updated when a traffic sign exists in the limited region of interest, and a previous state may be maintained when a traffic sign does not exists in the limited region of interest.

In addition, step (e) may be to determine the traffic sign being currently recognized to have passed and to terminate tracking when the traffic sign has not been tracked during three or more frames, to accumulate probability values of the respective traffic signs which are outputted as the results of an SVM with respect to tracking-terminated objects, and to determine a traffic sign having the greatest probability value as a final result.

In accordance with another aspect of the present invention, a system for recognizing a speed limit sign includes: an image acquisition unit for acquiring a front image using a front camera; a traffic sign detector for detecting a traffic sign from the acquired front image using a Haar-Feature based Viola-Jones Adaptive Boosting (Adaboost) algorithm, which is used for object detection; a recognition unit for recognizing an internal numeral in the detected traffic sign; a tracking unit for tracking a traffic sign continuously appearing in the front image, and eliminating a temporarily misrecognized object; and a decision unit for determining a result of speed limit recognition on the recognized traffic sign.

In addition, the Haar-Feature based Viola-Jones Adaptive Boosting (Adaboost) algorithm may be configured to include a plurality of strong classifiers in a cascade structure, and to include: a traffic sign training (sample training) step of training the traffic sign detector using a traffic sign image (positive sample), which is an object to be actually recognized, and a non-traffic sign image (negative sample); and a scan-window search step of determining whether a sub-window, which is received using a scan-window search scheme with respect to a region of interest (ROI) of the front image, corresponds to an actual "traffic sign" or a "non-traffic sign".

In addition, the traffic sign detector may be trained with the traffic sign image (positive sample) obtained by adding one or two margin pixels to an extracted image and then performing normalization into 20×20, and a non-traffic sign image (negative sample) randomly extracted from an image which does not include a traffic sign, the traffic sign image and the non-traffic sign image being in a ratio of 1:2 in number.

In addition, the traffic sign detector may include: a horizontal detector which has been trained only for a part constituted by 20 horizontal and 10 vertical in an image normalized into 20×20; and a vertical detector which has been trained only for a part constituted by 10 horizontal and 20 vertical in an image normalized into 20×20, wherein a region on which an overlap occurs by the horizontal detector and the vertical detector may be detected as an actual "traffic sign" region.

In addition, the recognition unit may calculate an actual limit speed using a support vector machine (SVM) with respect to a region which is determined as a "traffic sign" region in a detection result of the traffic sign detector, wherein the recognition unit may perform: a sample training step of detecting feature points using a traffic sign image (positive sample) and a non-traffic sign image (negative sample), training with the feature points, and calculating a support vector; and a speed recognition step of calculating probabilities of belonging to traffic sign image categories with inner products between the calculated support vector and feature points of an input image, and recognizing a numeral of the greatest probability value as a speed.

In addition, the tracking unit may track the traffic sign according to template matching, set the inside of a traffic sign recognized in an image of time "t" as a template, limit a region of interest (ROI) in an image of time "t+1" on the basis of a moving speed of a corresponding vehicle, update tracking contents when a traffic sign exists in the limited region of interest, and maintain a previous state when a traffic sign does not exists in the limited region of interest.

In addition, the decision unit may determine the traffic sign being currently recognized to have passed and terminate tracking when the traffic sign has not been tracked during three or more frames, accumulate probability values of the respective traffic signs which are outputted as the results of an SVM with respect to tracking-terminated objects, and determine a traffic sign having the greatest probability value as a final result.

In accordance with another aspect of the present invention, a system for recognizing a speed limit sign includes: an image acquisition unit for acquiring a front image using a front camera; a traffic sign detector for training with a traffic sign image (positive sample), which is an object to be actually recognized, and a non-traffic sign image (negative sample) with respect to the acquired front image using a Haar-Feature based Viola-Jones Adaptive Boosting (Adaboost) algorithm, and determining whether a sub-window, which is received using a scan-window search scheme with respect to a region of interest (ROI) of the front image, corresponds to an actual "traffic sign" or a "non-traffic sign"; a recognition unit for recognizing an internal numeral using a support vector machine (SVM) with respect to a region which is determined as a "traffic sign" region in a detection result of the traffic sign detector, and calculating an actual limit speed; a tracking unit for tracking a traffic sign continuously appearing in the front image and eliminating a temporarily misrecognized object, wherein the tracking unit tracks the traffic sign according to template matching, sets the inside of a traffic sign recognized in an image of time "t" as a template, limits a region of interest (ROI) in an image of time "t+1" on the basis of a moving speed of a corresponding vehicle, updates tracking contents when a traffic sign exists in the limited region of interest, and maintains a previous state when a traffic sign does not exists in the limited region of interest; and a decision unit for determining the traffic sign being currently recognized to have passed and terminating tracking when the traffic sign has not been tracked during three or more frames, accumulating probability values of the respective traffic signs which are outputted as the results of an SVM with respect to tracking-terminated objects, and determining a traffic sign having the greatest probability value as a final result.

In addition, the traffic sign detector may include: a horizontal detector which has been trained only for a part constituted by 20 horizontal and 10 vertical in an image normalized into 20×20; and a vertical detector which has been trained only for a part constituted by 10 horizontal and 20 vertical in an image normalized into 20×20, wherein a region on which an overlap occurs by the horizontal detector and the vertical detector may be detected as an actual "traffic sign" region.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
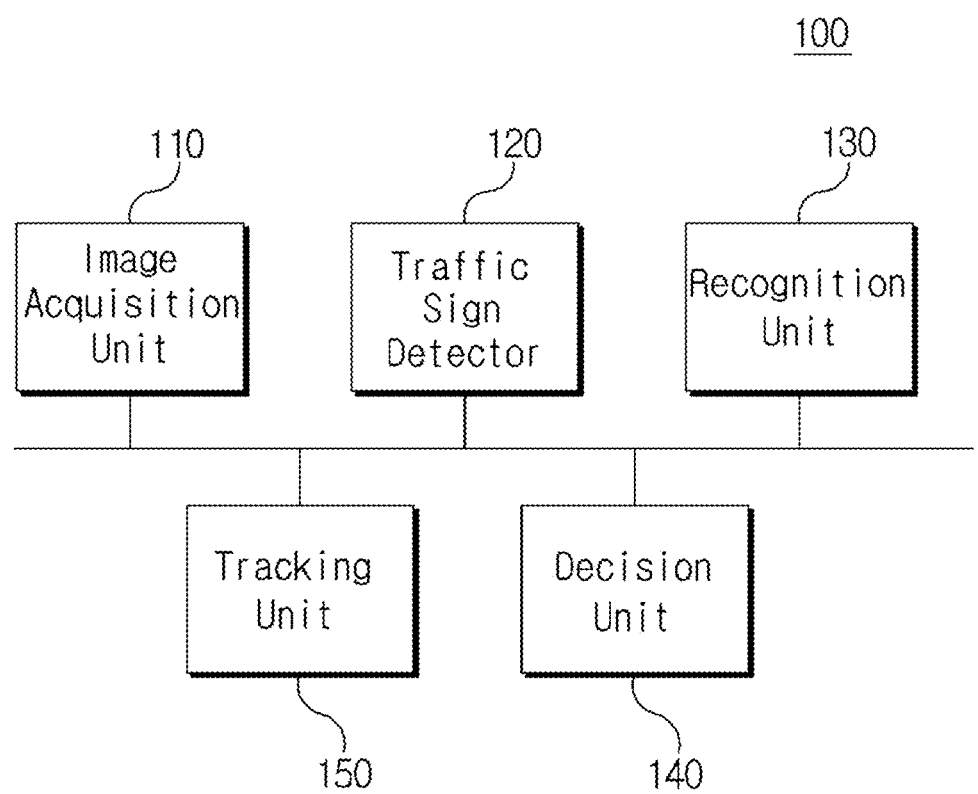
FIG. 1 is a block diagram schematically illustrating the configuration of a speed limit sign recognition system according to an embodiment of the present invention.

As the present invention may make various changes and have various forms, it is intended to illustrate specific embodiments in the drawings and describe them in detail. However, it should be understood that this is intended not to limit the present invention to specific disclosed forms but to include all changes, equivalents and replacements that fall within the spirit and technical scope of the present invention.

A speed limit sign recognition system and method using a front camera according to embodiments of the present invention will be described in detail below with reference to the accompanying drawings. In the accompanying drawings, the same or corresponding elements have the same reference numerals allotted, and description thereof will not be repeated.

FIG. 1 is a view schematically illustrating the configuration of a speed limit sign recognition system according to an embodiment of the present invention.

Referring to FIG. 1, a speed limit sign recognition system 100 according to an embodiment of the present invention includes an image acquisition unit 110, a traffic sign detector 120, a recognition unit 130, a tracking unit 140, and a decision unit 150.

The image acquisition unit 110 acquires a front image using a front camera.

The traffic sign detector 120 detects a traffic sign from the acquired front image.

In addition, the traffic sign detector 120 performs a detection operation on a traffic sign using a Haar-Feature based Viola-Jones Adaptive Boosting (Adaboost) algorithm, which is used for object detection.

Here, the Adaptive Boosting algorithm includes a plurality of strong classifiers having a cascade structure, and is to identify whether an input image corresponds to a "traffic sign" or a "non-traffic sign".

In addition, the adaptive boosting algorithm includes: a traffic sign training (sample training) step of training the traffic sign detector using a traffic sign image (positive sample) of an actual recognition target, and a non-traffic sign image (negative sample); and a scan-window search step of determining whether a sub-window, which is received using a scan-window search scheme with respect to a region of interest (ROI) of a front image, corresponds to an actual "traffic sign" or a "non-traffic sign".

In addition, the traffic sign image (positive sample) is obtained by adding one or two margin pixels to an extracted image and then normalizing the image into a size of 20×20, and the non-traffic sign image (negative sample) is randomly extracted from an image which does not include a traffic sign.

In addition, the traffic sign detector can be trained with traffic sign images (positive samples) and non-traffic sign images (negative samples) which are in a ratio of 1:2 in number.

In addition, the traffic sign detector 120 may include a horizontal detector and a vertical detector.

Here, the horizontal detector has been trained only for a part constituted by 20 horizontal and 10 vertical in an image normalized into a size of 20×20, and the vertical detector has been trained only for a part constituted by 10 horizontal and 20 vertical in an image normalized into a size of 20×20.

In addition, the traffic sign detector 120 detects a region on which an overlap occurs by the horizontal detector and the vertical detector, as an actual "traffic sign" region.

The recognition unit 130 recognizes an internal numeral on the detected traffic sign.

In addition, the recognition unit 130 calculates an actual limit speed using a support vector machine (SVM) with respect to a region which has been determined to be a "traffic sign" region as a detection result of the traffic sign detector.

In addition, the recognition unit 130 performs: a sample training step of detecting feature points using a traffic sign image (positive sample) and a non-traffic sign image (negative sample), training with the feature points, and calculating a support vector; and a speed recognition step of calculating probabilities of belonging to the respective traffic sign image categories with inner products between the calculated support vector and feature points of an input image, and recognizing a numeral of the greatest probability value as a speed.

In addition, in the speed recognition step, a probability that an input image belongs to each traffic sign image category is calculated according to equation 1 below using a multi-SVM based on the radial basis kernel (RBF).

$$k(X_i, X_j) = \exp(-\gamma \|X_i - X_j\|^2) \quad (1)$$

The tracking unit 140 tracks a traffic sign which continuously appears in front images and eliminates a temporarily misrecognized object.

In addition, the tracking unit 140 tracks a traffic sign according to template matching, sets the inside of a traffic sign recognized in an image of time "t", as a template, limits a region of interest (ROI) in an image of time "t+1" on the basis of the moving speed of the corresponding vehicle, updates tracking contents when a traffic sign exists in the limited region of interest, and maintains a previous state when a traffic sign does not exists therein.

The decision unit 150 decides a result of the speed limit recognition with respect to the recognized traffic sign. In addition, the decision unit 150 determines a traffic sign to have passed and terminates the tracking when the traffic sign has not been tracked during three or more frames, accumulates probability values of the respective traffic signs which are outputted as the results of the SVM with respect to tracking-terminated objects, and determines a traffic sign having the greatest probability value as a final result.

Figure 2:
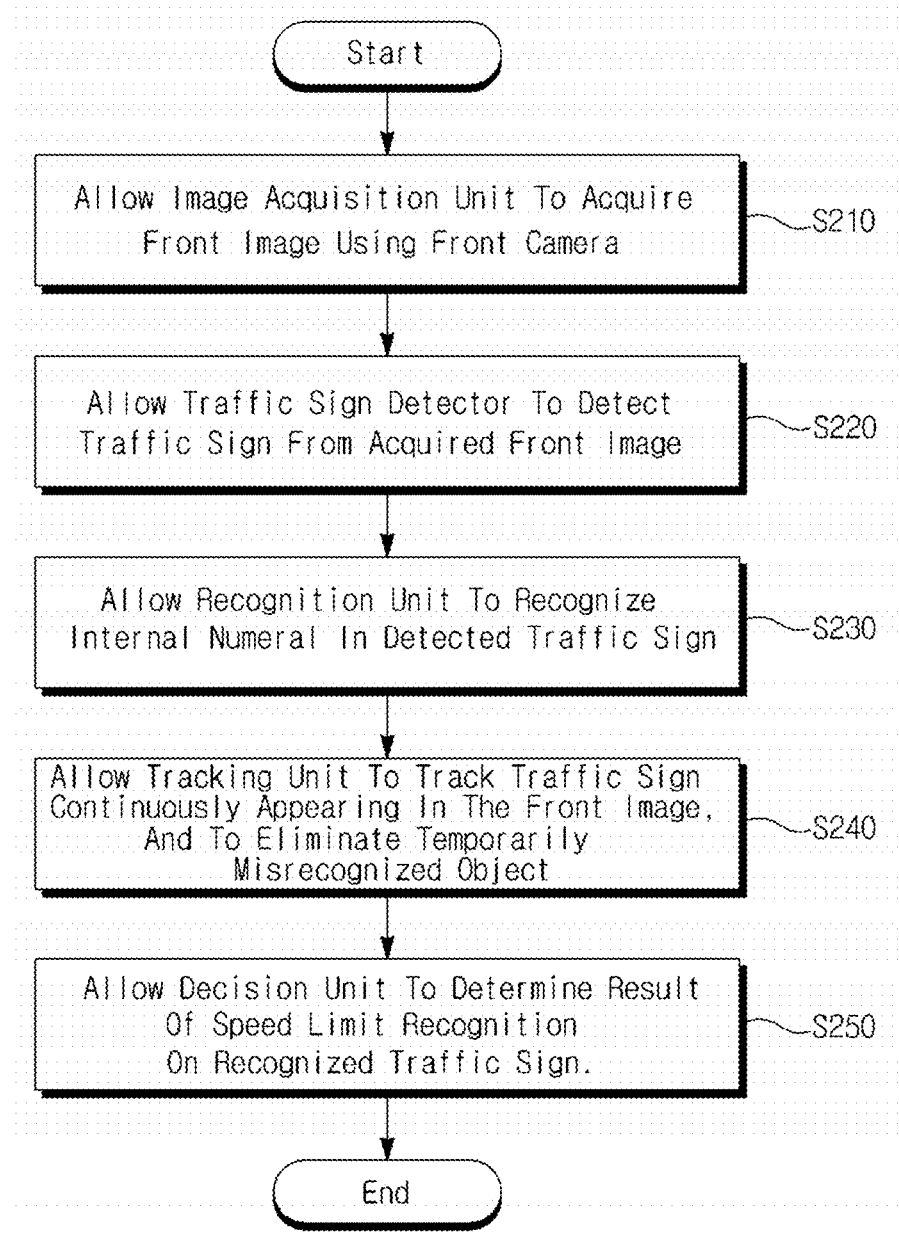
FIG. 2 is a flowchart is an operational flowchart explaining a speed limit sign recognition method using a front camera according to an embodiment of the present invention.

FIG. 2 is an operational flowchart explaining a speed limit sign recognition method using a front camera according to an embodiment of the present invention.

Referring to FIG. 2, the speed limit sign recognition system 100 according to an embodiment of the present invention first controls the image acquisition unit 110 to acquire a front image using a front camera in step S210.

Subsequently, the traffic sign detector 120 detects a traffic sign from the acquired front image in step S220.

Figure 3:
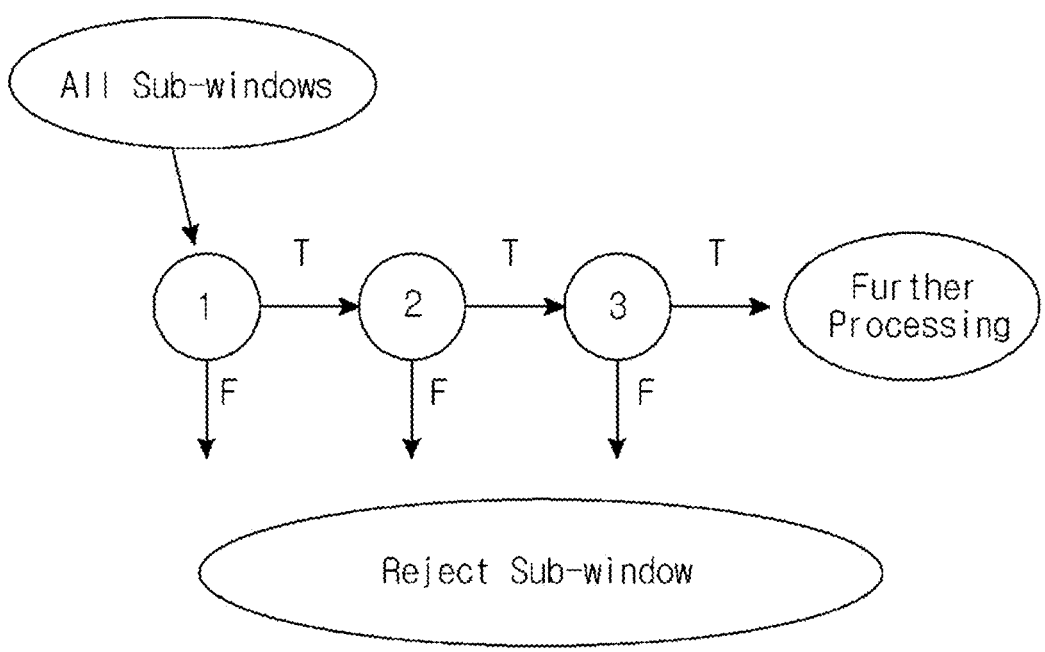
FIG. 3 is a view illustrating an Adaboost-based object detection which is applied to the present invention.

That is to say, the traffic sign detector 120 detects a traffic sign using a Haar-Feature based Viola-Jones Adaptive Boosting (Adaboost) algorithm used for object detection, as illustrated in FIG. 3. FIG. 3 is a view illustrating Adaboost-based object detection which is applied to the present invention.

In addition, the Adaptive Boosting algorithm includes a plurality of strong classifiers having a cascade structure, and is to identify whether an input image corresponds to a "traffic sign" or a "non-traffic sign".

Figure 4:
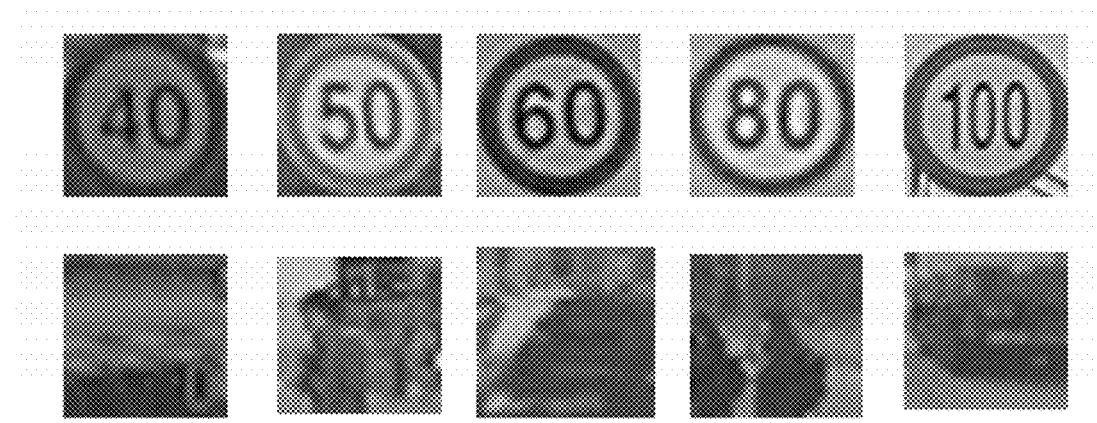
FIG. 4 is a view illustrating traffic sign images (positive samples) and non-traffic sign images (negative samples) according to an embodiment of the present invention.

In addition, the adaptive boosting algorithm includes: as illustrated in FIG. 4, a traffic sign training (sample training)

step of training the detector using a traffic sign image (positive sample) of an actual recognition target, and a non-traffic sign image (negative sample); and a scan-window search step of determining whether a sub-window, which is received using a scan-window search scheme with respect to a region of interest (ROI) of a front image, corresponds to an actual "traffic sign" or a "non-traffic sign". FIG. 4 is a view illustrating traffic sign images (positive samples) and non-traffic sign images (negative samples) according to an embodiment of the present invention.

In FIG. 4, traffic sign images (positive samples) have been obtained by adding one or two margin pixels to extracted images and then normalizing the respective images into a size of 20×20, and non-traffic sign images (negative samples) have been randomly extracted from images which do not include a traffic sign. In this case, 5,000 number of traffic sign images are used, and 10,000 number of non-traffic sign images are used according to each stage. Therefore, in order to acquire the best performance, it is preferred that the numbers of samples with respect to traffic sign images (positive samples) and non-traffic sign images (negative samples) are in a ratio of 1:2 in number. According to each stage, the minimum recognition rate is 99.5%, the maximum misrecognition rate is 50%, and the number of training stages is 20.

According to Korean laws, the minimum height of a traffic sign should be 1 m, and the maximum height thereof should be 5 m. Since traffic signs having a lower height than that stipulated in the laws can be easily found in normal construction sections, a region of interest (ROI) is set to include traffic signs having a height of at least 0.5 m and at most 5 m in consideration of the traffic signs of the construction sections. As a result of simulations with respect to multiple scale factors (1.1, 1.2. 1.3, 1.4), it was found that a scale factor of "1.2" is the most preferable in the scan-window search step.

Figure 5:
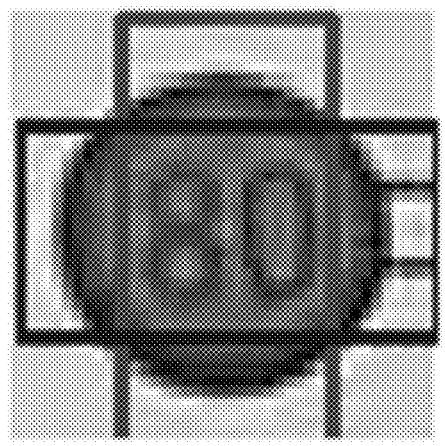
FIG. 5 is a view explaining a horizontal detection and a vertical detector according to an embodiment of the present invention.

In addition, the detector may include a horizontal detector and a vertical detector. FIG. 5 is a view explaining a horizontal detector and a vertical detector according to an embodiment of the present invention. That is to say, the horizontal detector has been trained only for a part constituted by 20 horizontal and 10 vertical in an image normalized into a size of 20×20, and the vertical detector has been trained only for a part constituted by 10 horizontal and 20 vertical in an image normalized into a size of 20×20.

Therefore, the traffic sign detector 120 detects a region on which an overlap occurs by the horizontal detector and the vertical detector, as an actual "traffic sign" region.

Subsequently, the recognition unit 130 recognizes an internal numeral on the detected traffic sign in step S230.

Figure 6:
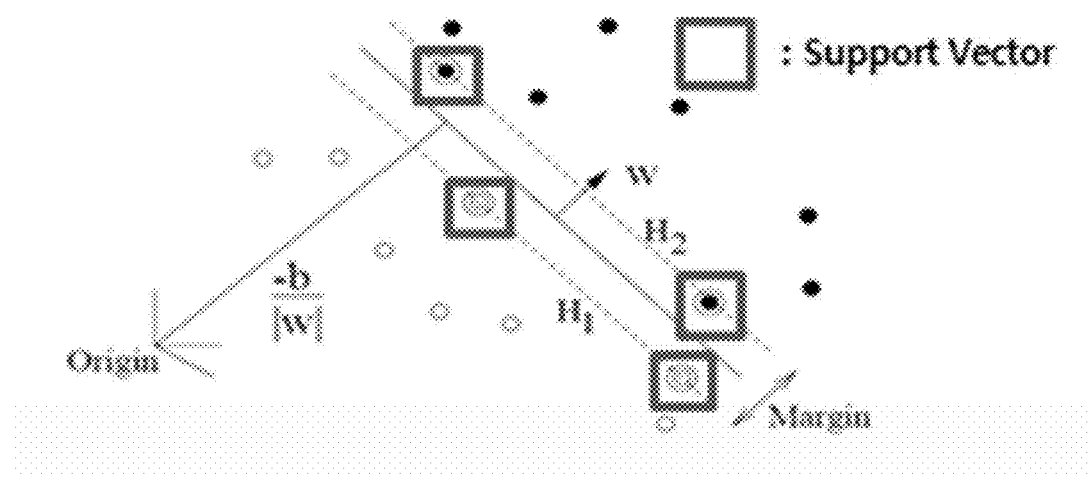
FIG. 6 is a view showing an example of SVM-based recognition according to an embodiment of the present invention.

That is to say, the recognition unit 130 calculates an actual limit speed using a support vector machine (SVM), as illustrated in FIG. 6, with respect to a region which has been determined to be a "traffic sign" region as a detection result of the traffic sign detector 120. FIG. 6 is a view showing an example of SVM-based recognition according to an embodiment of the present invention.

In addition, the recognition unit 130 may perform: a sample training step of detecting feature points using a traffic sign image (positive sample) and a non-traffic sign image (negative sample), training with the feature points, and calculating a support vector; and a speed recognition step of calculating probabilities of belonging to the respective traffic sign image categories with inner products between the calculated support vector and feature points of an input image, and recognizing a numeral of the greatest probability value as a speed.

Here, the positive samples correspond to speed limit signs which are classified according to each category from 30 KPH to 110 KPH, and are normalized into images having a size of 50×50. The negative samples are configured with data misrecognized in a detection step. Here, 30,000 number of positive samples are used wherein a balance between samples is not separately considered.

Figure 7:
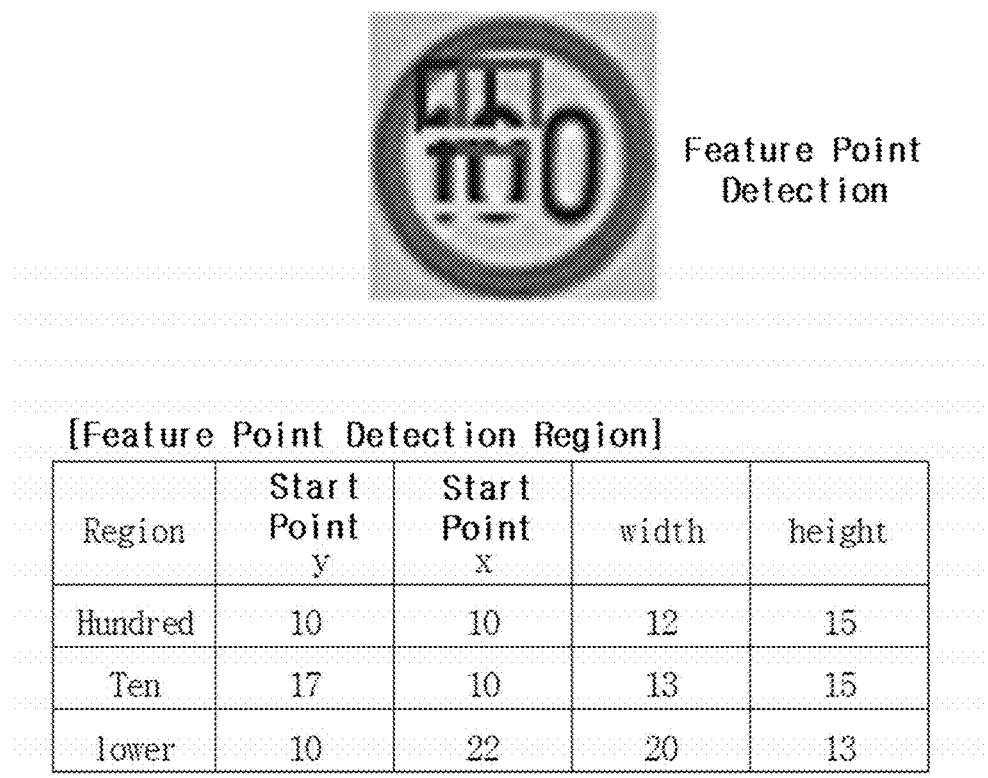
FIG. 7 is a view illustrating a feature point detection region according to an embodiment of the present invention.

For the feature points, normalized gray values are used, as illustrated in FIG. 7, in order to minimize an influence by lighting. FIG. 7 is a view illustrating a feature point detection region according to an embodiment of the present invention. Since all traffic signs include numeral "0" at the ends there, a remaining portion, except for a portion on which the numeral "0" is, is set as a region upon detection of feature points. In addition, a support vector to be actually used in recognition is calculated using a SVM.

Then, in the speed recognition step, a probability that an input image belongs to each traffic sign image category is calculated according to equation 1 using a multi-SVM based on the radial basis kernel (RBF).

Figure 8:
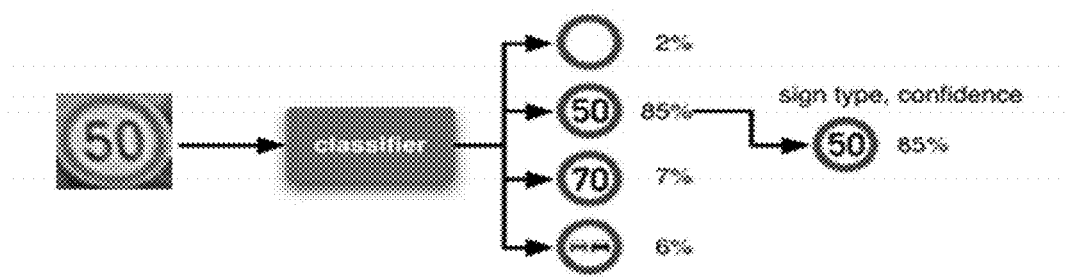
FIG. 8 is a view illustrating a procedure of obtaining a result of recognition according to an embodiment of the present invention.

The result of the calculation produces probabilities (confidences) that an input image belongs to each positive sample category (30-110 KPH), as illustrated in FIG. 8, a speed having the greatest value of the probabilities is expressed as a result with respect to the current input image. FIG. 8 is a view illustrating a procedure of obtaining a result of recognition according to an embodiment of the present invention. As illustrated in FIG. 8, when an image of a speed sign with "50" recorded thereon is classified, and it is calculated that the probability to correspond to zero "0" is 2%, the probability to correspond to speed "50" is 85%, the probability to correspond to speed "70" is 7%, and the probability to correspond to "No overtaking" is 6%, speed "50" having the greatest probability value is determined.

Subsequently, the tracking unit 140 tracks a traffic sign which continuously appears in front images and eliminates a temporarily misrecognized object in step S240.

In this case, the tracking unit 140 tracks a traffic sign according to template matching, sets the inside of a traffic sign recognized in an image of time "t", as a template, limits a region of interest (ROI) in an image of time "t+1" on the basis of the moving speed of the corresponding vehicle, updates a tracker when a traffic sign exists in the limited region of interest, and maintains a previous state when a traffic sign does not exists therein.

Subsequently, the decision unit 150 decides a result of the speed limit recognition with respect to the recognized traffic sign in step S250.

In this case, the decision unit 150 determines a traffic sign to have passed and terminates the tracking when the traffic sign has not been tracked during three or more frames, accumulates probability values of the respective traffic signs which are outputted as the results of the SVM with respect to tracking-terminated objects, and determines a traffic sign having the greatest probability value as a final result.

As described above, according to the present invention, it is possible to implement a speed limit sign recognition system and method using a front camera which can track a traffic sign continuously appearing in images which are obtained by a photographing speed limit sign located in front of a vehicle using a camera mounted on the front of the vehicle, recognize an internal numeral of the traffic sign, and inform the driver of an actual limit speed through the recognized numeral.

According to the present invention, although a traffic sign in an image obtained by photographing the front of a vehicle is twisted and is shown as an ellipse, it is possible to detect a speed limit sign, to extract a numeral in the traffic sign, and to recognize a limit speed.

In addition, since a single model of circular traffic signs are used for speed limit signs, it is possible to recognize speed limit contents even when a traffic sign is twisted or an internal numeral is curved, and to inform the driver of the recognized contents so that the driver can drive at a corresponding speed.

The present invention can be applied to a speed limit sign recognition system and method using a front camera for tracking a traffic sign continuously appearing in images which are obtained by a photographing speed limit sign located in front of a vehicle using a camera mounted on the front of the vehicle, recognizing an internal numeral of the traffic sign, and informing the driver of an actual limit speed through the recognized numeral.

Since those skilled in the art to which the present invention belongs may understand that the present invention may be carried out in other specific forms without changing the technical concepts or essential features thereof, it should be understood that the examples stated above are illustrative in every way, not limitative. The scope of the present invention is defined by the following claims, and all modified or varied forms derived from the meaning and scope of the claims and also equivalent concepts thereof should be interpreted to be included in the scope of the present invention.

What is claimed is:

1. A method for recognizing a speed limit sign using a front camera, comprising:
   acquiring a front image using a front camera;
   detecting, by a traffic sign detector comprising a horizontal detector and a vertical detector, a traffic sign from the acquired front image using a Haar-Feature based Viola-Jones Adaptive Boosting (Adaboost) algorithm;
   recognizing an internal numeral in the detected traffic sign;
   tracking a traffic sign continuously appearing in the front image, and eliminating a temporarily misrecognized object; and
   determining a result of recognition on the recognized traffic sign,
   wherein a region of overlap of the horizontal detector and the vertical detector comprises an actual traffic sign region.

2. The method according to claim 1, wherein, the Haar-Feature based Viola-Jones Adaptive Boosting (Adaboost) algorithm, which is used for object detection, is used to detect the traffic sign.

3. The method according to claim 2, wherein the Haar-Feature based Viola-Jones Adaptive Boosting (Adaboost) algorithm is configured to include a plurality of strong classifiers in a cascade structure, and to identify whether an input image is a traffic sign image (positive sample) obtained by adding one or two margin pixels to an extracted image and then performing normalization into 20×20, or a non-traffic sign image (negative sample) randomly extracted from an image which does not include an image of the traffic sign.

4. The method according to claim 2, wherein the Haar-Feature based Viola-Jones Adaptive Boosting (Adaboost) algorithm comprises:
   a traffic sign training (sample training) step of training a detector using a traffic sign image (positive sample), which is an object to be actually recognized, and a non-traffic sign image (negative sample); and
   a scan-window search step of determining whether a sub-window, which is received using a scan-window search scheme with respect to a region of interest (ROI) of the front image, corresponds to the actual traffic sign or a non-traffic sign.

5. The method according to claim 4, wherein the Haar-Feature based Viola-Jones Adaptive Boosting (Adaboost) algorithm is configured to train the detector using the traffic sign image (positive sample) and the non-traffic sign image (negative sample) which are in a ratio of 1:2 in number.

6. The method according to claim 4, wherein the Haar-Feature based Viola-Jones Adaptive Boosting (Adaboost) algorithm is configured to train for a part constituted by 20 horizontal and 10 vertical in an image normalized into 20×20 through the horizontal detector, or to train for a part constituted by 10 horizontal and 20 vertical in an image normalized into 20×20 through the vertical detector.

7. The method according to claim 6, wherein the Haar-Feature based Viola-Jones Adaptive Boosting (Adaboost) algorithm is to detect the region on which the overlap occurs by the horizontal detector and the vertical detector, as the actual traffic sign region.

8. The method according to claim 1, wherein, in the recognizing the internal numeral in the detected traffic sign, an actual limit speed is calculated using a support vector machine (SVM) with respect to a region which is determined as a traffic sign region in a detection result of the detecting the traffic sign.

9. The method according to claim 8, wherein the recognizing the internal numeral in the detected traffic sign comprises:
   a sample training step of detecting feature points using a traffic sign image (positive sample) and a non-traffic sign image (negative sample), training a recognizer with the feature points, and calculating a support vector; and
   a speed recognition step of calculating probabilities of belonging to traffic sign image categories with inner products between the calculated support vector and feature points of an input image, and recognizing a numeral of the greatest probability value as a speed.

10. The method according to claim 1, wherein, in the tracking the traffic sign, the traffic sign is tracked according to template matching, the inside of a traffic sign recognized in an image of time "t" is set as a template, a region of interest (ROI) in an image of time "t+1" is limited on the basis of a moving speed of a corresponding vehicle, a tracker is updated when a traffic sign exists in the limited region of interest, and a previous state is maintained when a traffic sign does not exists in the limited region of interest.

11. The method according to claim 1, wherein, in the recognizing the internal numeral in the detected traffic sign,
   the traffic sign being currently recognized is determined to have passed and tracking is terminated when the traffic sign has not been tracked during three or more frames, probability values of the respective traffic signs which are outputted as the results of an SVM with respect to tracking-terminated objects are accumulated, and a traffic sign having the greatest probability value is determined as a final result.

12. A system for recognizing a speed limit sign, comprising:
   an image acquisition unit for acquiring a front image using a front camera;
   a traffic sign detector for detecting a traffic sign from the acquired front image using a Haar-Feature based Viola-Jones Adaptive Boosting (Adaboost) algorithm, which is used for object detection;
   a recognition unit for recognizing an internal numeral in the detected traffic sign;
   a tracking unit for tracking a traffic sign continuously appearing in the front image, and eliminating a temporarily misrecognized object; and
   a decision unit for determining a result of speed limit recognition on the recognized traffic sign, wherein the traffic sign detector comprises a horizontal detector and a vertical detector, and wherein a region of overlap of the horizontal detector and the vertical detector comprises an actual traffic sign region.

13. The system according to claim 12, wherein the Haar-Feature based Viola-Jones Adaptive Boosting (Adaboost) algorithm is configured to include a plurality of strong classifiers in a cascade structure and to comprise:

a traffic sign training (sample training) step of training the traffic sign detector using a traffic sign image (positive sample), which is an object to be actually recognized, and a non-traffic sign image (negative sample); and a scan-window search step of determining whether a sub-window, which is received using a scan-window search scheme with respect to a region of interest (ROI) of the front image, corresponds to the actual traffic sign or a non-traffic sign.

14. The system according to claim 13, wherein the traffic sign detector is trained with the traffic sign image (positive sample) obtained by adding one or two margin pixels to an extracted image and then performing normalization into 20×20, and a non-traffic sign image (negative sample) randomly extracted from an image which does not include a traffic sign, the traffic sign image and the non-traffic sign image being in a ratio of 1:2 in number.

15. The system according to claim 12, wherein the horizontal detector has been trained for a part constituted by 20 horizontal and 10 vertical in an image normalized into 20×20; and the vertical detector which has been trained for a part constituted by 10 horizontal and 20 vertical in an image normalized into 20×20.

16. The system according to claim 12, wherein the recognition unit calculates an actual limit speed using a support vector machine (SVM) with respect to a region which is determined as a traffic sign region in a detection result of the traffic sign detector, wherein the recognition unit performs:

a sample training step of detecting feature points using a traffic sign image (positive sample) and a non-traffic sign image (negative sample), training with the feature points, and calculating a support vector; and a speed recognition step of calculating probabilities of belonging to traffic sign image categories with inner products between the calculated support vector and feature points of an input image, and recognizing a numeral of the greatest probability value as a speed.

17. The system according to claim 12, wherein the tracking unit tracks the traffic sign according to template matching, sets the inside of a traffic sign recognized in an image of time "t" as a template, limits a region of interest (ROI) in an image of time "t+1" on the basis of a moving speed of a corresponding vehicle, updates tracking contents when a traffic sign exists in the limited region of interest, and maintains a previous state when a traffic sign does not exists in the limited region of interest.

18. The system according to claim 12, wherein the decision unit determines the traffic sign being currently recognized to have passed and terminates tracking when the traffic sign has not been tracked during three or more frames, accumulates probability values of the respective traffic signs which are outputted as the results of an SVM with respect to tracking-terminated objects, and determines a traffic sign having the greatest probability value as a final result.

19. A system for recognizing a speed limit sign, comprising:

an image acquisition unit for acquiring a front image using a front camera;

a traffic sign detector for training with a traffic sign image (positive sample), which is an object to be actually recognized, and a non-traffic sign image (negative sample) with respect to the acquired front image using a Haar-Feature based Viola-Jones Adaptive Boosting (Adaboost) algorithm, and determining whether a sub-window, which is received using a scan-window search scheme with respect to a region of interest (ROI) of the front image, corresponds to an actual traffic sign or a non-traffic sign;

a recognition unit for recognizing an internal numeral using a support vector machine (SVM) with respect to a region which is determined as a traffic sign region in a detection result of the traffic sign detector, and calculating an actual limit speed;

a tracking unit for tracking a traffic sign continuously appearing in the front image and eliminating a temporarily misrecognized object, wherein the tracking unit tracks the traffic sign according to template matching, sets the inside of a traffic sign recognized in an image of time "t" as a template, limits a region of interest (ROI) in an image of time "t+1" on the basis of a moving speed of a corresponding vehicle, updates tracking contents when a traffic sign exists in the limited region of interest, and maintains a previous state when a traffic sign does not exists in the limited region of interest; and a decision unit for determining the traffic sign being currently recognized to have passed and terminating tracking when the traffic sign has not been tracked during three or more frames, accumulating probability values of the respective traffic signs which are outputted as the results of an SVM with respect to tracking-terminated objects, and determining a traffic sign having the greatest probability value as a final result.

20. The system according to claim 19, wherein the traffic sign detector comprises: a horizontal detector which has been trained only for a part constituted by 20 horizontal and 10 vertical in an image normalized into 20×20; and a vertical detector which has been trained only for a part constituted by 10 horizontal and 20 vertical in an image normalized into 20×20, wherein a region on which an overlap occurs by the horizontal detector and the vertical detector is detected as an actual "traffic sign" region.

* * * * *